MEMORY ADDRESSING REGISTER COMPRISING BISTABLE CIRCUIT WITH CURRENT STEERING MEANS HAVING DISABLING MEANS

Filed Feb. 28, 1963 2 Sheets-Sheet 1

INVENTOR.
EDWARD LINDELL
BY Arthur Frederick
Samuel Lindenberg
ATTORNEYS

EDWARD LINDELL
INVENTOR.

BY Arthur Frederick
Samuel Lindenberg
ATTORNEYS

United States Patent Office 3,284,640
Patented Nov. 8, 1966

3,284,640

MEMORY ADDRESSING REGISTER COMPRISING BISTABLE CIRCUIT WITH CURRENT STEERING MEANS HAVING DISABLING MEANS

Edward Lindell, Los Angeles, Calif., assignor to Ampex Corporation, Culver City, Calif., a corporation of California Filed Feb. 28, 1963, Ser. No. 261,721
6 Claims. (Cl. 307—88.5)

This invention relates generally to digital memory systems and more particularly to an improved memory addressing means for providing access to addressed locations in a random access memory.

Mostly recently developed data processing devices, including digital computers, employ random access memory systems which comprise a plurality of interconnected memory elements which can be, e.g. single and multiple aperture magnetic cores, tunnel diodes, cryotrons, etc. Regardless of the particular memory elements employed, all prior art random access memory systems require that the address of a specified location in the memory be provided by some external device, such as a digital computer control unit, in order for information to be written into and read from a desired memory location. The address provided by the external device is generally stored in an address register associated with the memory, the register normally being composed of a group of triggerable binary flip-flops connected in a straight-forward set, reset configuration. The outputs of the register flip-flops are combined and applied to a decoding circuit which in response thereto selects one address location or word in the memory. Inherent in such an access system is the problem of obtaining an unambiguous selection in a minimum amount of time. Since the individual elements of the address register (flip-flops) are binary in nature, a certain amount of hysteresis is present when the state of each element is changed. In order to obtain an unambiguous output, a certain time interval is required to allow the elements to settle into their desired states. In most systems, at the end of this interval, usually called the settling time, a strobe pulse is provided to cause the information stored in the addressed location to be accessed. It should of course be apparent that the necessity of providing for this settling time is undesirable inasmuch as it significantly lengthens the memory access time and consequently limits the amount of data that can be processed in a unit time period.

In view of the above, it is an object of the present invention to provide a memory system including improved addressing apparatus, capable of accessing information in a shorter time than has been possible in heretofore known memory systems.

It is an additional object of the present invention to provide apparatus for use in a digital memory system which obviates the normal requirement of waiting for the address register flip-flops to settle before accessing the memory.

Briefly, the invention herein is based on the recognition that the delay which must normally be provided between the time appropriate address signals are applied by an external device, such as a computer control unit, to a memory address register and the time information is accessed from the addressed location, the delay being necessary to give the address register flip-flops sufficient time to settle, can be eliminated by initially applying the address signals to a current steering circuit which in addition to applying appropriate input information to the flip-flops, effectively bypasses the flip-flops to apply the information directly to a decoding circuit.

In this manner, the address signals can be decoded immediately and no time interval need be set aside to permit the flip-flops to settle. After the flip-flops have settled, there is no further need to directly apply the signals to the decoding circuit and therefore, the current steering circuit can be effectively isolated from the decoding circuit. In addition, the flip-flops can be isolated from the external device thereby assuring that the flip-flops retain the stored address signals throughout the memory cycle. At the completion of the memory cycle, appropriate signals are applied to the flip-flops to switch them to a neutral state to thereby effectively isolate them from the decoding circuit so as to prepare the equipment for subsequent memory cycles. By maintaining the flip-flops in a neutral state and by consequently causing all of the decoding circuit output lines to be false at all times except when a memory access is to actually take place, the normally required strobe pulse for selectively connecting the decoding circuit to the memory is avoided.

Although the discussion herein is mostly directed to accessing information from memory, it should be understood that the disclosed apparatus is, of course, equally useful for writing information into memory. That is, the invention herein is directed toward the selection of a desired memory location, whether it be for reading or writing purposes.

Furthermore, it should be further understood that the apparatus disclosed herein is equally useful with any type of random access memory system regardless of the particular type of memory element utilized therein.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
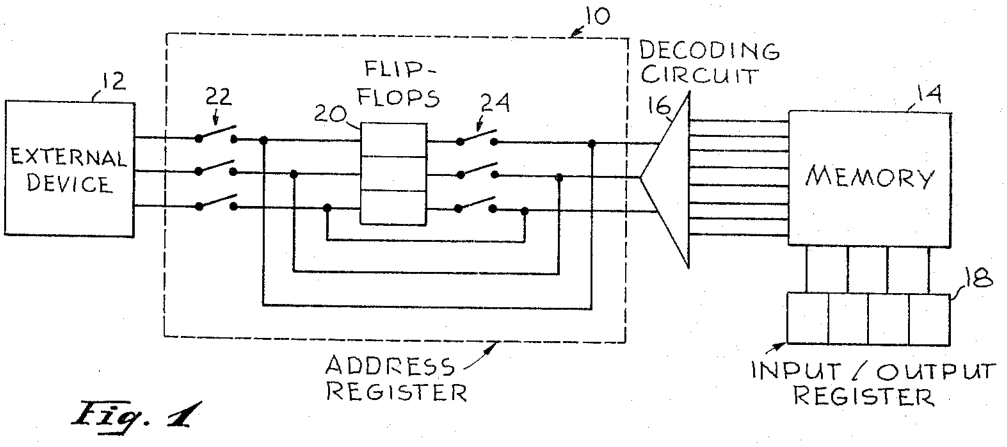
FIGURE 1 is a block diagram of a memory system employing the memory addressing apparatus disclosed herein.

Initial attention is called to FIGURE 1 which illustrates a block diagram of the memory addressing apparatus including an address register 10 constructed in accordance with the invention, utilized in combination with an external device 12, which can comprise a digital computer control unit capable of generating address signals identifying locations in a random access memory device 14. In addition to these elements, FIGURE 1 illustrates a decoding circuit 16 adapted to receive the address signals from the address register 10 for the purpose of selecting in response thereto, one of the locations in the memory device 14. An input-output register 18 is provided in association with the memory device 14 and is adapted to store information to be written into the memory location selected by the output of the decoding circuit 16 or alternatively, to store information to be read from the memory location selected by the output of decoding circuit 16.

Whereas prior art address registers utilized to couple the output of an external device 12 to the input of a decoding circuit 16 generally comprise a plurality of flip-flops arranged in a straightforward set-reset configuration, the address register 10 provided herein includes means which can bypass the flip-flops to apply address signals directly to the decoder 16. In this manner the requirement for providing a delay between the time the address signals are applied to the address register and the time at which information is read out, from the location in memory 14 identified by the address signals, into the register 18 is obviated. Conventionally, the address signals are read into the address register flip-flops and at the end of the delay which must be provided to permit the flip-flops time to settle, a strobe pulse is generated to gate the information stored in the flip-flops, representing the address signals, to the decoding circuit 16. The information must be held in the flip-flops and continually applied to the decoding circuit 16 for the duration of the memory cycle.

More particularly, the broad concept taught herein and illustrated in FIGURE 1 is to provide a flip-flop register 20 in the address register 10, for storing the address signals provided by the external device 12 and for applying these signals over the duration of a memory cycle to the decoding circuit 16. However, in addition to the flip-flop register 20, appropriate bypass or parallel current paths are provided for permitting the instantaneous application of the address signals generated by the external device 12, to the decoding cricuit 16. That is, by initially closing switches 22, the bits of the digital address signal provided by the external device 12 are applied both to the inputs of the flip-flops of the flip-flop register 20 and in addition directly to the inputs of the decoding circuit 16. A very short time later, the switches 24 are closed and a short time after that switches 22 are opened. It should be apparent therefore that as a result of this sequence, the address signals are instantaneously applied to the decoding circuit 16 while the flip-flops in the flip-flop register 20 are given time to settle. Once the flip-flops in the flip-flop register 20 have settled, the switches 22 can be opened so as to electrically isolate the flip-flop register 20 from the external device 12. As a consequence, it is assured that the flip-flop register 20 will provide the appropriate address signals to the decoding circuit 16 for the full duration of the memory cycle without there being any possibility that signals generated by the external device 12 will change the content of the flip-flop register 20. At the end of the memory cycle switches 24 are opened.

Figure 2:
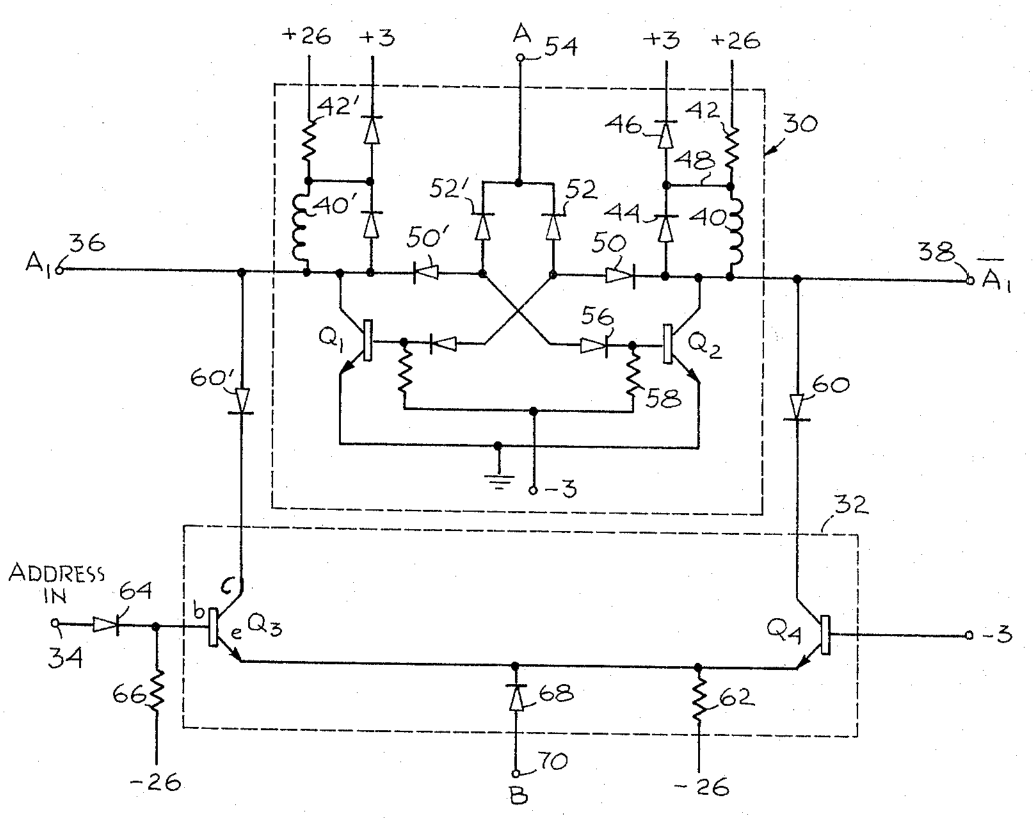
FIGURE 2 is a schematic diagram illustrating the details of one stage of an address register constructed in accordance with the invention.
Figures 3, 4:
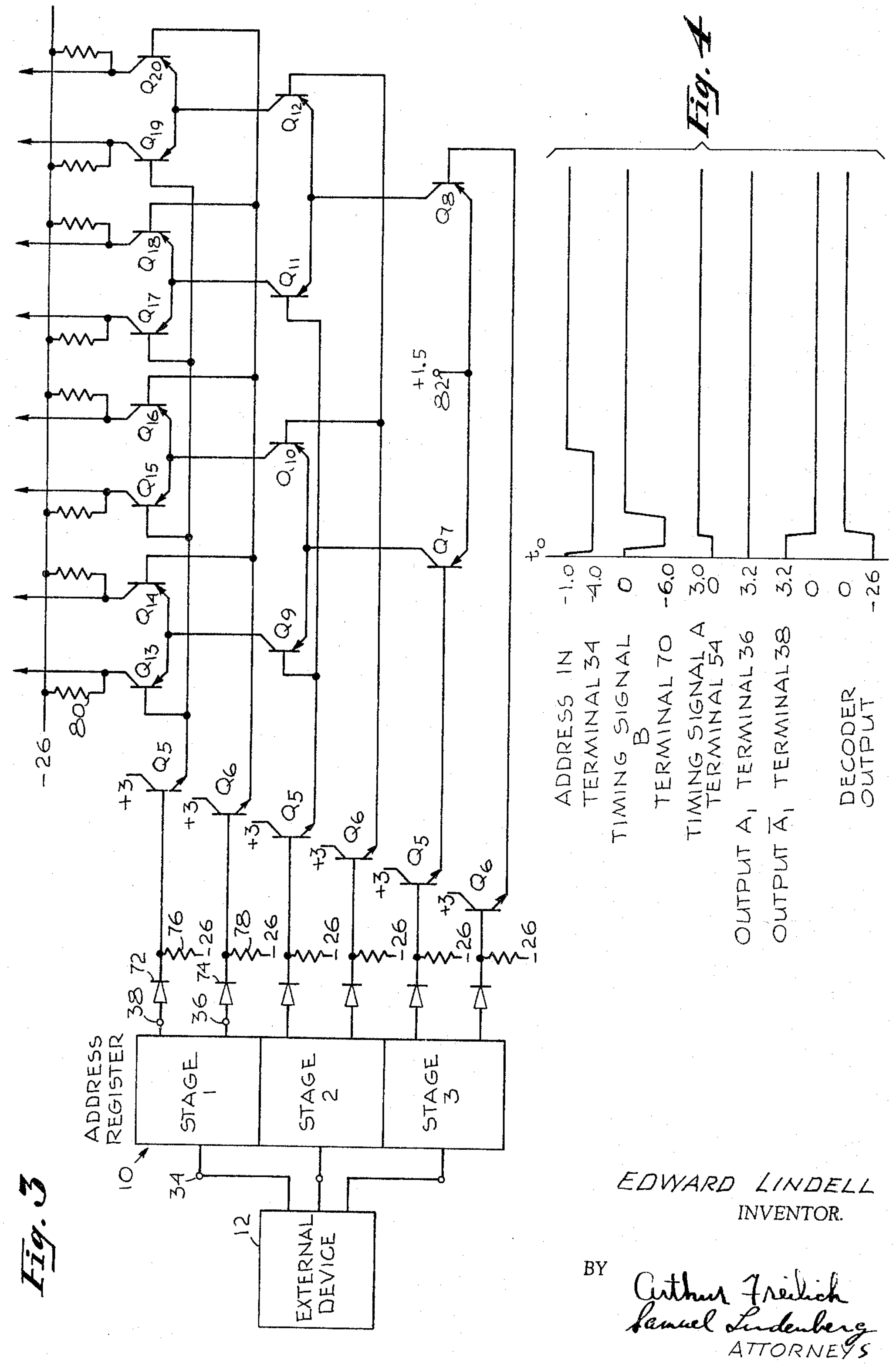
FIGURE 3 is a schematic diagram illustrating the details of a decoding circuit particularly useful in conjunction with the memory addressing apparatus introduced herein.
FIGURE 4 is a waveform chart illustrating the voltage excursions, as a function of time, at various points in the circuits of FIGURES 2 and 3.

It is to be understood that FIGURE 1 is only a schematic illustration of the contemplated action of the preferred embodiment of the invention which is disclosed in detail in FIGURES 2 through 4. Attention is now called to FIGURE 2 wherein one stage of the address register 10 of FIGURE 1 is illustrated. As should be apparent from FIGURE 1, it has been assumed that the address signals generated by the external device 12 consisted of three binary bits and as a consequence the address register 10 requires three stages. Utilizing a three bit binary address of course permits the selection of any one of eight locations in memory 14. FIGURE 2 shows one stage of the address register; that is, the circuitry in the address register utilized to handle one bit of the three bit binary address. It is of course to be understood that the invention is applicable to handle addresses of any bit length and the three bit address structure shown herein is for exemplary purposes only.

Each stage of the address register 10 can be considered as being composed of two basic sections; namely, a bistable circuit 30 and a current steering circuit 32. Additionally, each stage may be considered as having a single input terminal 34 which is connected to the external device 12 and a pair of output terminals 36 and 38 which as will be seen below, are connected to the decoding circuit 16.

Bistable circuit 30 includes a pair of transistors Q1 and Q2 which are illustrated as being of the NPN type. The collector of transistor Q2 is serially connected through inductor 40 and resistor 42 to a source of positive potential, nominally shown as +26 volts. Additionally, the collector of transistor Q2 is connected through serially connected diodes 44 and 46 to a positive potential source, nominally shown as +3 volts. Conductor 48 connects the circuit junction between diodes 44 and 46 to the circuit junction between inductor 40 and resistor 42. The collector of transistor Q2 is further connected through diodes 50 and 52 to a control terminal 54 to which timing signal A, as shown in the chart of FIGURE 4 is applied. Additionally, the collector of transistor Q2 is connected to the output terminal 38.

Inasmuch as the components associated with transistor Q1 are identical to those associated with transistor Q2, identical designating numerals will be utilized to identify them except however that the designated numerals identifying components associated with transistor Q1 will be primed.

The base of transistor Q2 is connected through diode 56 to the junction defined between diodes 50′ and 52′. Additionally, the base of transistor Q2 is connected through resistor 58 to a source of negative potential, nominally shown as —3 volts. The emitter of transistor Q2 is grounded.

The current steering circuit 32 includes transistors Q3 and Q4, also shown as being of NPN type. The base of transistor Q4 is connected to a negative reference potential, nominally shown as —3 volts. The collector of transistor Q4 is connected through diode 60 to output terminal 38. The emitter of transistor Q4 is connected through resistor 62 to a source of negative potential, nominally shown as —26 volts.

Input terminal 34, connected to external device 12, is connected through diode 64 to the base of transistor Q3. Additionally, resistor 66 couples the base of transistor Q3 to a source of negative potential, nominally shown as —26 volts. A diode 68 connects the emitters of both transistors Q3 and Q4 to control terminal 70 to which, as will be seen below, is applied timing signal B shown in the chart of FIGURE 4.

For an understanding of the operation of the circuit of FIGURE 2, attention is called to the chart of FIGURE 4 which should be considered in conjunction with the circuit diagram.

Note that the timing signal B initially applied to control terminal 70 is at 0 volts and that as a consequence diode 68 is forward biased and a current flows in the series circuit comprised of diode 68 and resistor 62. The voltage drop across resistor 62 raises the emitter potentials of transistors Q3 and Q4 to approximately 0 volts which is sufficiently high to off bias each of these transistors. When the value of the timing signal B drops to —6 volts, the potential of the emitters of transistors Q3 and Q4 falls to thereby permit one of the transistors to conduct. More particularly, if first a binary signal having a value of —1 volt is applied to the input terminal 34, transistor Q3 will be biased on and as a consequence a current will be established in the series circuit including resistor 42′, inductor 40′, diode 60′, transistor Q3 and resistor 62. As a consequence, the potential of the emitter of transistor Q4 will be driven sufficiently high to hold transistor Q4 off. On the other hand, if a binary signal of —4 volts is applied to the input terminal 34, a current will be established in the series circuit including transistor Q4 and resistor 42, inductor 40, diode 60, and resistor 62 and as a consequence the emitter of transistor Q3 will be driven sufficiently high to hold transistor Q3 off. It should accordingly be clear that so long as the potential applied to control terminal 70 is 0 volts, neither of the transistors Q3 or Q4 will conduct. However, if a negative potential of —6 volts is applied to control terminal 70, transistor Q3 will conduct and transistor Q4 will be biased off if the potential applied to input terminal 34 is more positive than —3 volts, i.e. the reference potential applied to the base of transistor Q4, and transistor Q4 will conduct and transistor Q3 will be biased off if the potential applied to input terminal 34 is more negative than —3 volts.

Note well that when neither transistor Q3 nor transistor Q4 is conducting, the potential on both output terminals 36 and 38 is established by the respective series paths comprising resistor 42, inductor 40, diode 44, and diode 46. Inasmuch as the voltage drop across the diodes 44 and 46 is nominal, the voltage levels of output terminals 36 and 38 will normally reside slightly above +3 volts. When however, transistor Q4 conducts, the voltage level at output terminal 38 will be pulled down to approximately 0 volts while similarly, when transistor Q3 conducts, the voltage level at output terminal 36 will be pulled down to approximately 0 volts. The output terminal not associated with the conducting transistor will remain at a level slightly below 3 volts.

As long as the timing signal A applied to control terminal 54 is 0 volts, the junction between diodes 50 and 52 cannot rise above 0 volts and accordingly the potential applied to the bases of transistors Q1 and Q2 respectively must be slightly below 0 volts due to the drop across diode 56 caused by the current through the series circuit including diode 56 and resistor 58. However, when the timing signal A rises to a voltage level of +3 volts, the junction between diodes 50 and 52 is able to rise to +3 volts which would therefore be sufficient to on-bias both transistors Q1 and Q2. However, it is to be noted that the timing signal A is raised from 0 to +3 volts subsequent to the fall of the timing signal B from 0 to −6 volts. Consequently, by the time the timing signal A rises to +3 volts, the output terminal 36 or 38 and accordingly the collector of either transistor Q1 or Q2 is established at approximately an 0 volt potential. For example only, let it be assumed that transistor Q4 is conducting and accordingly that output terminal 38 resides at approximately 0 volts while output terminal 36 is at approximately +3 volts. As the timing signal A rises from 0 to +3 volts, the junction between diodes 50 and 52 and the junction between diodes 50′ and 52′, tend to rise to +3 volts. However, the junction between diodes 50 and 52 cannot rise substantially above 0 volts inasmuch as a voltage level of 0 volts has been established at output terminal 38. Consequently, the base of transistor Q1 remains substantially at 0 volts thereby keeping transistor Q1 off-biased. In contrast thereto, the voltage level at the base of transistor Q2 rises to approximately +1 volt and accordingly transistor Q2 becomes on-biased. Since transistor Q2 is conducting, when timing signal B returns from −6 volts to 0 volts the voltage level at output terminal 38 remains at 0 volts due to the conduction through transistor Q2.

It is to be noted that when timing signal B returns from −6 to 0 volts, both transistor Q3 and transistor Q4 become off-biased accordingly effectively electrically isolating the bistable circuit 30 from the external device 12 connected to the input terminal 34. Consequently, the bistable circuit 30 maintains its state throughout the memory cycle so long as the timing signal A remains at +3 volts. At the conclusion of the memory cycle, the level of the timing signal A is reduced to 0 volt accordingly cutting off whichever of transistors Q1 and Q2 were conducting. From the foregoing explanation of the operation of the address register stage in FIGURE 2, it should be apparent that the functions performed by timing signals A and B are analogous to the functions performed by switches 24 and 22 in FIGURE 1.

Attention is now called to FIGURE 3 wherein a block diagram of the external device 12 and address register 10 are illustrated in conjunction with a circuit diagram of a typical decoder circuit particularly adapted for use with the address register shown in FIGURE 2. As previously noted, it has herein been assumed that the address signals consist of three binary bits which thereby enable any one of eight possible memory locations to be addressed.

The output terminals 36 and 38 of each stage of the address register are respectively connected through diodes 72 and 74 to control transistors Q5 and Q6. Resistors 76 and 78 respectively connect the bases of transistors Q5 and Q6 to a source of negative potential, nominally shown as −26 volts. The collectors of transistors Q5 and Q6 are connected directly to a positive potential source nominally shown as +3 volts. The emitters of transistors Q5 and Q6 associated with stage 3 of the address register are respectively connected to the bases of transistors Q7 and Q8. The emitters of Q7 and Q8 are connected to terminal 82 to which is applied a positive potential source, nominally shown as +1.5 volts. The collector of transistor Q7 is connected to the emitters of transistors Q9 and Q10 while the collector of transistor Q8 is connected to the emitters of transistors Q11 and Q12. The emitter of transistor Q5 associated with stage 2 of the address register is connected to the bases of transistors Q9 and Q11. The emitter of transistor Q6 associated with stage 2 of the address register is connected to the bases of transistors Q10 and Q12. The collector of transistor Q9 is connected to the emitters of Q13 and Q14, the collector of transistor Q10 is connected to the emitters of transistors Q15 and Q16, the collector of transistor Q11 is connected to the emitters of transistors Q17 and Q18, and the collector of transistor Q12 is connected to the emitters of Q19 and Q20. The emitter of transistor Q5 associated with stage 1 of the address register is connected to the bases of transistors Q13, Q15, Q17, and Q19 while the emitter of transistor Q6 associated with stage 1 of the address register is connected to the bases of transistors Q14, Q16, Q18, and Q20.

The collectors of each of the eight transistors Q13–Q20 are connected through a dropping resistor 80 to a source of negative potential, nominally shown as −26 volts. The collectors of transistors Q13–Q20 form the output lines of decoding circuit 16 which are coupled to the memory 14 for selecting a particular memory location for reading or writing.

In operation, prior to time $t_0$, shown in the chart of FIGURE 4, the output terminals 36 and 38 of all of the stages of the address register reside at approximately +3 volts. As a consequence, each of the control transistors Q5 and Q6 associated with each stage of the address register is conducting. This in turn prevents any of the transistors Q7–Q20 from conducting inasmuch as all of their bases are held positive with respect to their emitters. As a consequence, the collectors of the eight output transistors Q13–Q20 all reside at −26 volts.

At time $t_0$ however, information is provided from the external device 12 to the address register 10 and as a result one of the output terminals, either output terminal 36 or 38, in each stage of the address register falls from +3 volts to 0 volt. As a consequence, the transistors Q5 and Q6 which have 0 volt potential applied to their base are cut off. Accordingly, certain ones of the transistors Q7–Q20 start to conduct inasmuch as their bases are no longer held positive with respect to their emitters. More particularly, one of transistors Q7 and Q8 will become on-biased, two of transistors Q9–Q12 will become on-biased, and four of transistors Q13–Q20 will become on-biased. It should be apparent therefore that an unambiguous current path will be established from the terminal 82 to which the positive potential source is connected through one transistor in each stage of the transistor decoding network. As a consequence, current will be driven through one of the resistors 80 thereby driving the potential of the connected collector to a level somewhat below +1.5 volts.

From the foregoing, it should be apparent that a memory addressing apparatus has been disclosed useful for accepting address information from an external device 12 and for developing an unambiguous signal on one output line of a decoding circuit 16 for application to a memory device 14. More particularly, it should further be apparent that an address register has been disclosed herein which permits the instantaneous application of address signals generated by external device 12 to the decoding circuit 16, without requiring a time delay during which the address register flip-flops are permitted to settle. The normally necessary time delay has been obviated by providing in addition to the flip-flops in the address register, current steering circuits which initially provide the appropriate information to the decoding circuit 16 while the flip-flops are settling and then effectively become electrically isolated from the external device 12 to prevent random or inadvertant signals provided by the external device during the memory cycle from affecting the information stored in the address register flip-flops. It should further be noted that because the flip-flops are switched to a neutral state whenever the memory is not actually being accessed, all of the output lines of the decoding circuit 15 will be false. As a consequense the normally required utilization of a strobe pulse to selectively connect the decoding circuit output to the memory is avoided.

I claim:

1. In a register for storing binary address signals identifying locations in a memory storage device and for applying said signals to a decoding circuit connected to said memory storage device, a bistable circuit having first and second input terminals and first and second output terminals and means connecting each of said output terminals to a different one of said input terminals; a current steering circuit having an input terminal and first and second output terminals; means applying said address signals to said current steering circuit input terminal; said current steering circuit being responsive to the two possible values of said applied binary address signals for respectively providing output signals on either its first or second output terminals; and means for connecting said first output terminals together and to said decoding circuit and said second output terminals together and to said decoding circuit; and means for selectively disabling said current steering circuit.

2. In a register for storing binary address signals identifying locations in a memory storage device and for applying said signals to a decoding circuit connected to said memory storage device, a bistable circuit having first and second input terminals and first and second output terminals and means connecting each of said output terminals to a different one of said input terminals; a current steering circuit having an input terminal and first and second output terminals; means applying said address signals to said current steering circuit input terminal; said current steering circuit being responsive to the two possible values of said applied binary address signals for respectively providing output signals on either its first or second output terminals; means for connecting said first output terminals together and to said decoding circuit and said second output terminals together and to said decoding circuit; and means for selectively rendering said current steering circuit non-responsive to said applied binary address signals.

3. In a register for storing binary address signals identifying locations in a memory storage device and for applying said signals to a decoding circuit connected to said memory storage device, a bistable circuit including first and second transistors each respectively having a base, a collector and an emitter; means connecting the collector of said first transistor to the base of said second transistor and the collector of said second transistor to the base of said first transistor; means connecting said first and second transistor emitters to a first reference potential; a current steering circuit including third and fourth transistors each respectively having a base, a collector and an emitter; means connecting the base of said fourth transistor to a second reference potential; means applying said address signals to the base of said third transistor;

means interconnecting said third and fourth transistor emitters for causing said third transistor to conduct and said fourth transistor to be cut off when the potential of the applied address signal is above said second reference potential and for causing said fourth transistor to conduct and said third transistor to be cut off when the potential of the applied address signal is below said second reference potential; means connecting the collector of said fourth transistor to the collector of said second transistor and the collector of said third transistor to the collector of said first transistor; and means connecting the junction between said fourth and second transistor collectors and the junction between said third and first transistor collectors to said decoding circuit.

4. In a register for storing binary address signals identifying locations in a memory storage device and for applying said signals to a decoding circuit connected to said memory storage device, a bistable circuit including first and second transistors each respectively having a base, a collector and an emitter; means connecting the collector of said first transistor to the base of said second transistor and the collector of said second transistor to the base of said first transistor; means connecting said first and second transistor emitters to a first reference potential; a current steering circuit including third and fourth transistors each respectively having a base, a collector and an emitter; means connecting the base of said fourth transistor to a second reference potential; means applying said address signals to the base of said third transistor; means interconnecting said third and fourth transistor emitters for causing said third transistor to conduct and said fourth transistor to be cut off when the potential of the applied address signal is above said second reference potential and for causing said fourth transistor to conduct and said third transistor to be cut off when the potential of the applied address signal is below reference potential; means connecting the collector of said fourth transistor to the collector of said second transistor and the collector of said third transistor to the collector of said first transistor; means connecting the junction between said fourth and second transistor collectors and the junction between said third and first transistor collectors to said decoding circuit; and means for simultaneously preventing conduction in both said third and fourth transistors.

5. In a register for storing binary address signals identifying locations in a memory storage device and for applying said signals to a decoding circuit connected to said memory storage device, a bistable circuit including first and second transistors each respectively having a base, a collector and an emitter; means connecting the collector of said first transistor to the base of said second transistor and the collector of said second transistor to the base of said first transistor; means connecting said first and second transistor emitters to a first reference potential; a current steering circuit including third and fourth transistors each respectively having a base, a collector and an emitter; means connecting the base of said fourth transistor to a second reference potential; means applying said address signals to the base of said third transistor; means interconnecting said third and fourth transistor emitters for causing said third transistor to conduct and said fourth transistor to be cut off when the potential of the applied address signal is above said second reference potential and for causing said fourth transistor to conduct and said third transistor to be cut off when the potential of the applied address signal is below said second reference potential; means connecting the collector of said fourth transistor to the collector of said second transistor and the collector of said third transistor to the collector of said first transistor; means connecting the junction between said fourth and second transistor collectors and the junction between said third and first transistor collectors to said decoding circuit; and circuit means for selectively applying potentials to said first and second transistors for simultaneously preventing conduction therein.

6. The combination of claim 3 wherein said decoder includes at least fifth and sixth transistors each respectively having a base, a collector and an emitter; said junctions being respectively connected to the bases of said fifth and sixth transistors; a current source; seventh and eighth transistors each respectively having a base, a collector and an emitter which emitters are connected to said current source; means respectively connecting the emitters of said fifth and sixth transistors to the bases of said seventh and eighth transistors and means respectively connecting the collectors of said fifth and sixth transistors to a third reference potential.

References Cited by the Examiner

UNITED STATES PATENTS

| | | | |
|---|---|---|---|
| 2,924,725 | 2/1960 | Blair | 307—88.5 |
| 2,986,658 | 5/1961 | Carlson | 307—88.5 |
| 2,997,605 | 8/1961 | Fortini | 307—88.5 |
| 3,045,128 | 7/1962 | Skerritt | 307—88.5 |
| 3,069,565 | 12/1962 | Van Ness | 307—88.5 |
| 3,089,125 | 5/1963 | Reynolds | 340—172.5 |
| 3,131,317 | 4/1964 | Yee | 307—88.5 |
| 3,201,761 | 8/1965 | Schmitt et al. | 340—172.5 |

ARTHUR GAUSS, *Primary Examiner.*

S. D. MILLER, *Assistant Examiner.*